(12) United States Patent
Lauri et al.

(10) Patent No.: US 8,168,293 B2
(45) Date of Patent: May 1, 2012

(54) FORMULATIONS FOR CELLULAR, FOAMED-POLYMER PRODUCTS BASED ON POLYVINYL CHLORIDE, IMPROVED CELLULAR, FOAMED-POLYMER PRODUCTS BASED ON POLYVINYL CHLORIDE AND A PROCESS FOR PRODUCING SAID IMPROVED CELLULAR FOAMED-POLYMER PRODUCTS

(75) Inventors: Leone Lauri, Belluno (IT); Sam Shehyee Ang, Irving, TX (US); Jan Jerry Christian Stigsson, Laholm (SE); Raffaela Bressan, Treviso (IT)

(73) Assignee: Diab International AB, Laholm (SE)

( * ) Notice: Subject to any disclaimer, the term of this patent is extended or adjusted under 35 U.S.C. 154(b) by 425 days.

(21) Appl. No.: 12/227,929

(22) PCT Filed: Jun. 5, 2007

(86) PCT No.: PCT/IB2007/001547
§ 371 (c)(1),
(2), (4) Date: Nov. 12, 2009

(87) PCT Pub. No.: WO2007/141647
PCT Pub. Date: Dec. 13, 2007

(65) Prior Publication Data
US 2010/0068487 A1    Mar. 18, 2010

(30) Foreign Application Priority Data
Jun. 8, 2006   (IT) ................ MI2006A1107

(51) Int. Cl.
*B32B 3/26*    (2006.01)
*C08J 9/30*    (2006.01)
*B29C 44/08*   (2006.01)
(52) U.S. Cl. .......... 428/304.4; 521/73; 521/137; 264/55
(58) Field of Classification Search ............... 428/304.4; 264/55; 521/73, 137
See application file for complete search history.

(56) References Cited

U.S. PATENT DOCUMENTS
5,352,710 A * 10/1994 Lauri ............................ 521/137
2007/0200266 A1 * 8/2007 Elser ............................ 264/54

FOREIGN PATENT DOCUMENTS
WO   WO 2005092958 A2 * 10/2005
* cited by examiner

*Primary Examiner* — Hai Vo
(74) *Attorney, Agent, or Firm* — Hedman & Costigan, P.C.; James V. Costigan

(57) ABSTRACT

Formulation for cellular, foamed-polymer product based on polyvinyl chloride, comprising: a polyvinyl chloride homopolymer having a K-value of from 60 to 85 and a pH value of the aqueous extract ranging of from 8 to 12; at least one isocyanate selected from isomers and homologues of diphenylmethane-4,4'-diisocyanate and modified diphenyl-methane-4,4-diisocyanate s and mixtures thereof; at least one anhydride selected from the group of succinic anhydride, tetrahydrophthalic anhydride, hexahydrophthalic anhydride, methyl-tetrahydrophthalic anhydride, 4-methyl-hexahydro-phthalic anhydride, cyclohexane-1,2-dicarboxylic anhydride, methyl-endomethylene tetrahydrophthalic anhydride, dodecenyl succinic anhydride, trimellitic anhydride and mixtures thereof; at least a surfactant; at least a foaming agent.

19 Claims, No Drawings

FORMULATIONS FOR CELLULAR, FOAMED-POLYMER PRODUCTS BASED ON POLYVINYL CHLORIDE, IMPROVED CELLULAR, FOAMED-POLYMER PRODUCTS BASED ON POLYVINYL CHLORIDE AND A PROCESS FOR PRODUCING SAID IMPROVED CELLULAR FOAMED-POLYMER PRODUCTS

The present invention relates to formulations for cellular, foamed-polymer products based on polyvinyl chloride, to improved cellular, foamed-polymer products based on polyvinyl chloride and to a process for producing said improved cellular foamed-polymer products.

Examples of the state of the art formulations for cellular, foamed-polymer products based on PVC consist of a mixture of polyvinyl chloride, of one or more isocyanates, such as toluene-diisocyanate and/or polymethylene-polyphenyl-isocyanate, one or more anhydrides, such as maleic anhydride and/or, phthalic anhydride, one or more vinylidene compounds, such as styrene and acrylonitrile, a foaming agent, one or more heat stabilizer compounds, such as tribasic lead sulfate, dibasic lead phosphite, dibasic lead phthalate. Further examples of heat stabilizer compounds are disclosed in EP0458404 and EP0513930. Said products are obtained through many processes as for example through the process disclosed in IT 1,224,390.

Another example of formulation for a starting mixture for preparing cross-linked PVC rigid-foam body is disclosed in WO 2005/092958, concerning however a discontinuous process and a formulation requiring the presence of epoxidized compounds in an amount of from 3 to 15% as stabilizers and plasticizers.

However, the products obtainable starting from said formulations are characterised by certain ranges of mechanical properties and the foamed products require long times of gelation under pressure, long expansion time and long curing time.

Such drawbacks are due, for example, to the use of any type of polyvinyl chloride and/or to the use of phthalic anhydride, increasing the acidity of the reaction environment. Furthermore the choices of the PVC resin and anhydride are both very important, the first because of not creating an acidic environment and the second because of its positioning at the end of the chain of the polymer, causing a higher fragility of the foamed polymer.

Generally, the cellular foamed-polymer products are produced through mixing of powders (PVC, anhydride, chemical blowing agents, PVC stabilizers and in some cases flame retardants and pigments) with liquids (isocyanates and sometimes plasticizers) into a fairly viscous mixture.

Said mixture, of thick consistency, after being compounded in a dissolver, is cast into a mould, and the temperature is then increased under pressure, until a temperature of from 150° C. to 200° C. is reached, in order to cause the gelation of polyvinyl chloride to take place and the decomposition of the blowing agent. In fact, the molding cause a phase inversion of the viscous mixture that forms the polymer gel. In addition the chemical blowing agents decompose to form gaseous nitrogen that is either dissolved into the gel to form tiny bubbles.

The semi-foamed article obtained, i.e., the "embryo", will complete its foaming by being heated in the presence of hot water or steam, where it expands to the desired density. The hot water or steam expansion is the result of the heated gel allowing growth from the dissolved nitrogen and additional gas formed through reaction with the isocyanate content of the gel with water that is diffusing into the gel.

The chemical reactions occur during moulding, where the chemical blowing agents decompose with a gas emission of nitrogen and during expansion where a complex series of water, isocyanate and anhydride reactions occur. When the semi-foamed products (embryo) are put in hot water or steam, water diffuses into the material. In the material several possible reactions can happen. The most likely reaction is the following reaction (1) where isocyanates react with water to form amine.

$$RNCO + H_2O \rightarrow RNH_2 + CO_2 \tag{1}$$

This is a reaction controlled by the rate of diffusion of water and depending on pH value. Some of formed $CO_2$ gas can diffuse out of the material, but most of the gas will stay in the material that will expand to form the rigid foam.

The general purpose of the present invention is that of providing a formulation for foamed-polymer products based on polyvinyl chloride, overcoming the state of the art drawbacks, giving a foamed-polymer product based on polyvinyl chloride, having definitely increased mechanical properties with respect to the existing products, the process of production presenting at the same time very short cycle pressure, low expansion and curing times. Furthermore the formulations for foamed-polymer products based on polyvinyl chloride according to the present invention do not require the presence of stabilizers or plasticizers which are, on the contrary, necessary in the products of the state of the art. Furthermore, the formulations according to the present invention allow to obtain foamed product with a very high "compatibility" with all prepregs based on polyesters, on polyvinylesters, on epoxy compounds, which are used in the industry all over the world. Further the process of production presents also a strong reduction of costs.

It is therefore object of the present invention a formulation for cellular, foamed-polymer product based on polyvinyl chloride, comprising: a polyvinyl chloride homopolymer having a K-value ranging of from 60 to 85 and a pH value of the aqueous extract ranging of from 8 to 12; at least one isocyanate selected from isomers and homologues of diphenylmethane-4,4'-diisocyanate and modified diphenylmethane-4,4'-diisocyanates and mixtures thereof; at least one anhydride selected from the group of succinic anhydride, tetrahydrophthalic anhydride, hexahydrophthalic anhydride, methyl-tetrahydrophthalic anhydride, 4-methyl-hexahydrophthalic anhydride, cyclohexane-1,2-dicarboxylic anhydride, methyl-endomethylene tetrahydrophthalic anhydride, dodecenyl succinic anhydride, trimellitic anhydride and mixtures thereof; at least a surfactant; at least a foaming agent.

It is also object of the present invention a cellular, foamed-polymer product based on polyvinyl chloride, obtainable from a starting formulation consisting of a mixture comprising: a polyvinyl chloride homopolymer having a K-value ranging of from 60 to 85 and a pH value of the aqueous extract ranging of from 8 to 12; at least one isocyanate selected from isomers and homologues of diphenylmethane-4,4'-diisocyanate and modified diphenylmethane-4,4'-diisocyanates and mixtures thereof; at least one anhydride selected from the group of succinic anhydride, tetrahydrophthalic anhydride, hexahydrophthalic anhydride, methyl-tetrahydrophthalic anhydride, 4-methyl-hexahydrophthalic anhydride, cyclohexane-1,2-dicarboxylic anhydride, methyl-endomethylene tetrahydrophthalic anhydride, dodecenyl succinic anhydride, trimellitic anhydride and mixtures thereof; at least a surfactant; at least a foaming agent.

Preferred polyvinyl chloride is a polyvinyl chloride homopolymer having a K-value ranging of from 60 to 75 and a pH value of the aqueous extract ranging of from 9 to 11.

More preferred polyvinyl chloride is a polyvinyl chloride homopolymer having a K-value of 70 (DIN ES ISO 1628-2) and a pH value of the aqueous extract equal to 10 (DIN ES ISO 1060-2).

Preferred isocyanates according to the present invention are modified diphenylmethane-4,4'-diisocyanates (4,4'-MDI). Among possible modified 4,4'-MDI, mixtures of 4,4'-MDI and 4,4'-MDI reacted with carbodiimide to make uretonimine modified MDI are more preferred. Even more preferred is a mixture of about 70% of 4,4'-MDI with about 30% of carbodiimide/uretonimine mixture.

Preferred anhydrides according to the present invention are methyl-tetrahydrophthalic anhydride, 4-methyl-hexahydrophthalic anhydride, cyclohexane-1,2-dicarboxylic anhydride. More preferred anhydride is a mixture of cyclohexane-1,2-dicarboxylic anhydride and 4-methyl-hexahydrophthalic anhydride in a ratio 70/30.

Surfactants according to the present invention are selected from standard silicone surfactants, the more preferred surfactant being silicone polyether graft copolymers, the most preferred having the following chemical structure

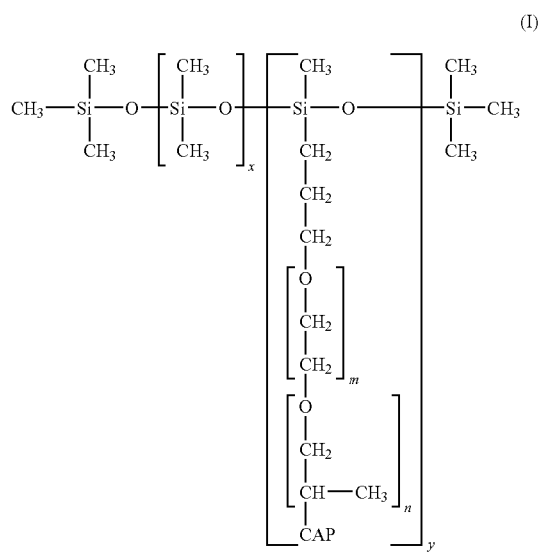

x representing dimethylsiloxane units; Y representing methylsiloxane units; m representing EO Units; n representing PO Units and CAP representing capping groups.

Foaming agents according to the present invention are selected from 2,2'-azobis isobutyronitrile (AZDN) and azodicarbonamide (ADC) and mixture thereof.

The formulation according to the present invention can also contain a catalyst selected from N,N'-dimethylbenzylamine or N-hydroxy-alkyl quaternary ammonium carboxylates and mixture thereof.

Said N-hydroxy-alkyl quaternary ammonium carboxylate is preferably the following compound $((CH_3)_3N-CH_2-(CH_3)CH(OH))^+(HCOO)^-$.

A particularly preferred formulation according to the present invention comprises a polyvinyl chloride homopolymer having a K-value of 70 and a pH value of the aqueous extract equal to 10; a mixture of 4,4'-MDI and 4,4'-MDI reacted with carbodiimide to make uretonimine modified MDI; a mixture of cyclohexane-1,2-dicarboxylic anhydride and 4-methyl-hexahydrophthalic anhydride in a ratio 70/30; silicone polyether graft copolymers according to formula (I), 2,2'-azobis isobutyronitrile (AZDN) and azodicarbonamide (ADC).

The components of the formulation according to the present invention may range in the following amounts expressed as percentage by weight with respect to the total weight: polyvinyl chloride in an amount ranging of from 35 to 60%; at least one anhydride in an amount of from 1 to 20%; at least one isocyanate in an amount of from 20 to 50%; at least a foaming agent in an amount of from 0.5 to 7%; at least a surfactant in an amount of from 0.08 to 0.8%.

Preferred percentages are the following: polyvinyl chloride in an amount ranging of from 40 to 55%; at least one anhydride in an amount of from 2 to 15%; at least one isocyanate in an amount of from 30 to 45%; at least a foaming agent in an amount of from 3 to 4.5%; at least a surfactant in an amount of from 0.1 to 0.6%.

The catalyst is present in an amount ranging of from 0 to 0.1%, preferably of from 0.02 to 0.05%.

In particular, the presence of the surfactant is very important, because, regulating the system, it has a direct influence on the structure/cellular orientation. Also the choice of the isocyanate is essential in the obtaining of a foamed polymer product presenting improved mechanical properties, with particular reference to percentage of shear strain.

Further object according to the present invention is a process for preparing a cellular foamed-polymer product obtainable starting from a formulation consisting of a mixture comprising a polyvinyl chloride homopolymer, having a K-value of from 60 to 85 and a pH value of the aqueous extract ranging of from 8 to 12; at least one isocyanate selected from isomers and homologues of diphenylmethane-4,4'-diisocyanate and modified diphenylmethane-4,4'-diisocyanates and mixture thereof; at least one anhydride selected from the group of succinic anhydride, tetrahydrophthalic anhydride, hexahydrophthalic anhydride, methyl-tetrahydrophthalic anhydride, 4-methyl-hexahydrophthalic anhydride, cyclohexane-1,2-dicarboxylic anhydride, methyl-endomethylene, tetrahydrophthalic anhydride, dodecenyl succinic anhydride, trimellitic anhydride and mixtures thereof; at least a surfactant; at least a foaming agent; said process comprising the following steps:

a) compounding the mixture by mixing the components in a dissolver under vacuum, preferably of from 0.7 to 0.99 bar, more preferably of from 0.8 to 0.9 bar, obtaining a paste-like product;

b) the paste-like product of step a) being poured into the mould and caused to undergo gelation under the action of temperature and pressure for a time ranging of from 40 seconds to 1 minute for each mm of height of the pasta-like product into the mould, to obtain a semi-foamed molded product (embryo);

c) cooling the semi-foamed molded product (embryo) up to room temperature;

d) in case of products having a final density of less than 80 kg/m³, adding the cooled product coming from step c) to steam (80-100° C.) to expand to the final density for a time of about 24 hours; or e) in case of products having a final density higher than 80 kg/m³ adding the cooled product coming from step c) to hot water and/or steam (80-100° C.) to expand to the final density for a time ranging of from 50 min a 2 hours; the so obtained expanded products being cooled up to room temperature and then being treated in water spray and/or steam (40-70° C.) to react any remaining isocyanates (curing), obtaining cured blocks or panels.

In step (b) gelation is carried out at a temperature typical of gelation of PVC, ranging of from 150 to 200° C., preferably of from 160 to 180° C., under a pressure ranging of from 200 to 400 bar for cm².

The product obtained from step c), before being submitted to step d) or step e), can be submitted to a dry expansion step for a time ranging of from 1 to 2 hours, at a temperature ranging of from 75 to 100° C., in anhydrous atmosphere.

Cured blocks can be planed to remove the hard skin that surrounds the cured block. After planing, the block can be sheeted prior to further processing. Following a planing or sheeting process the block or sheet can be sanded to provide a better dimensional tolerance.

Further object of the present invention are blocks or panels obtainable according to the process of the present invention.

The main advantage of the product and process of the present invention consists in that the reaction of isocyanates with water is really faster than according to the processes of the state of the art, thanks to the particular PVC used according to the present invention, having the claimed K value and basic pH value of the aqueous extract. Therefore, gelling time is lower, the gelation is very fast, and, as a consequence, also the processes of embryo formation and moulding are really faster.

The other main advantage of the formulations and products according to the present invention is that, very surprisingly, the foamed polymeric products according to the present inventions are endowed with definitely improved mechanical characteristics, i.e. improved Compressive Strength, Compressive Modulus, Tensile Strength, Tensile Modulus, Shear Strength, Shear modulus and Shear Strain, measured according to International standards (like ASTM, ISO).

Further advantage of the product and process according to the present invention is also in the expanding time to form the embryo, which is definitely lower than in the prior art processes, being comprised of from 50 minutes to 2 hours according to the present invention process.

When the dry expansion step is present, it allows to obtain a product of the wished density with the even more improved values both from a physico-chemical point of view and from an esthetic point of view.

A further advantage of the product and process according to the present invention is in that, for products having densities of from 30 to 80 kg/m³, expansion and curing cycles consist of a single step requiring about 24 hours, in comparison with curing cycle times of the state of the art of many days depending on the density.

For products having medium/high density, namely of from 100 to 400 kg/m³ or more, the two phases are distinct and the curing step lasts up to the end of the reaction.

In view of the previous considerations, it is evident that a further advantage of the process according to the present invention consists in definitely simpler and cheaper plants.

A further advantage of the formulations according to the present invention is that there is no necessity of stabilizers and/or plasticizers, and/or epoxy compounds, acting as plasticizers according to pages 7 and 16 of WO 2005/092958.

The following examples are given to better explain the content of the present invention but they are not limitative.

EXAMPLE 1

Preparation of Product (A)

In a dissolver/mixer, 1000 kg of the active starting formulation indicated with (A') in the following table 1, was mixed at a temperature, increasing of from 10 to 23° C., with a tolerance of 1-2° C., for 20-25 minutes, PVC being added to the other components during this time of 20-25 minutes. The mixing was then ended with 2-5 minutes under a vacuum of about 0.8-0.9 bar, up to obtain a viscous paste-like product.

Aluminum or steel molds were then filled with the paste-like product. The mold depth is 28 mm. The filled molds were then heated at 170-175° C. under a pressure of 200-400 bar for a total pressing time of 23 minutes (50 seconds×28 mm).

Expansion of the product cooled at room temperature, was made in steam for about 24 hours and at a temperature of about 95° C., progressively decreasing up to 80-85° C. All reactions ended in these hours time. Therefore no curing step was carried out.

The so obtained final cellular foamed-polymer product (A) based on PVC is endowed with particularly surprising and interesting properties which are indicated in Table 2.

EXAMPLE 2

Preparation of Product (B)

Following the same procedure disclosed in example 1, but in presence of a dry expansion step, a further cellular foamed-polymer product based on PVC (B) was obtained starting from 1300 kg of the active starting formulation indicated with (B') in the following table 1, said final cellular foamed-polymer product based on PVC (B) being endowed with mechanical properties which are indicated in Table 2.

Before carrying out the expansion step disclosed in example 1, a dry expansion of the product, cooled at room temperature, was carried out in anhydrous atmosphere, bringing the product at a temperature of 75° C. in 30 minutes, then raising the temperature at 98° C. in 45 minutes and then leaving the product at 98° C. for 75 minutes.

EXAMPLE 3

Preparation of Product (C)

Following the same procedure disclosed in example 2, a further cellular foamed-polymer product based on PVC (C) was obtained starting from 1200 kg of the active starting formulation indicated with (C') in the following table 1, said final cellular foamed-polymer product based on PVC (C) being endowed with mechanical properties which are indicated in Table 2.

EXAMPLE 4

Preparation of Product (D)

Following the same procedure disclosed in example 2, with the exception of the expansion step, a further cellular foamed-polymer product based on PVC (D) was obtained starting from 1200 kg of the active starting formulation indicated with (D') in the following table 1, said final cellular foamed-polymer product based on PVC (D) being endowed with mechanical properties which are indicated in Table 2.

In case of product (D), expansion was made in hot water and/or steam for about 2 hours and at a temperature of about 95-98° C. The expanded product was cooled at room temperature, possibly using suitable cooling means to accelerate the cooling step.

Then a curing step was carried out in hot water and/or steam at a temperature of from 40 to 70° C. up to the end of all reactions.

EXAMPLE 5

Preparation of Product (E)

Following the same procedure disclosed in example 2, a further cellular foamed-polymer product based on PVC (E) was obtained starting from 1000 kg of the active starting formulation indicated with (E') in the following table 1, said final cellular foamed-polymer product based on PVC (E) being endowed with mechanical properties which are indicated in Table 2.

TABLE 1

Active formulations of examples 1-5.

| Components (%) | (A') | (B') | (C') | (D') | (E') |
|---|---|---|---|---|---|
| PVC | 48.0 | 48.0 | 47.9 | 48.0 | 48.48 |
| AN70/30 | 11.5 | 6 | 3.2 | 3.2 | 9 |
| AZDN | 4.5 | 3.5 | 3.8 | 3.0 | 3.8 |

TABLE 1-continued

Active formulations of examples 1-5.

| Components (%) | (A') | (B') | (C') | (D') | (E') |
|---|---|---|---|---|---|
| ADC | 0.8 | 0.7 | 0.5 | 0.5 | 0.8 |
| CD MDI | 30.7 | 35.5 | 40.5 | 41.2 | 31.9 |
| PMDI | 4 | 6 | 4 | 4 | 6 |
| Surfactant | 0.5 | 0.3 | 0.1 | 0.1 | — |
| Catalyst | — | — | — | — | 0.02 |

In table 1, the abbreviations correspond to the following materials:

PVC is a polyvinyl chloride homopolymer having a K-value of 70 (DIN ES ISO 1628-2), a viscosity number of 125 cm$^3$/g (DIN ES ISO 1628-2), a pH value of the aqueous extract (DIN ES ISO 1060-2) equal to 10, as for example the product commercialised under the tradename Vestolit P 1353 K by the company Vestolit GmbH.

AN70/30 is a mixture of cyclohexane-1,2-dicarboxylic anhydride and 4-methyl-hexahydrophthalic anhydride with a concentration of cyclohexane-1,2-dicarboxylic anhydride of about 70% and a concentration of 4-methyl-hexahydrophthalic anhydride of about 30%, as for example the product commercialised under the tradename Anhydride 70-30 by the company LonzaGroup.

AZDN is 2,2'-azobis-isobutyronitrile, as for example the product commercialised under the tradename AZDN A by the company Elf Atochem-Atofina;

ADC is azodicarbonamide as for example the product commercialised under the tradename POROFOR ADC/F-C2 by the company Lanxess.

CD MDI is an uretonimine modified diphenylmethane-4,4'-diisocyanates (4,4'-MDI) obtained according to the following scheme:

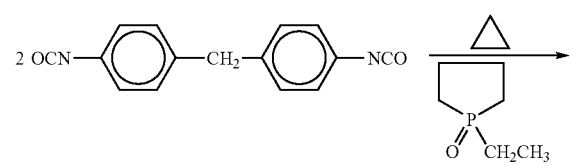

(4,4'-MDI) are catalysed with phospholine oxide (in batch processes) or with tri-ethyl phosphate in continuous process, at a temperature of 100° C. to 150° C.;

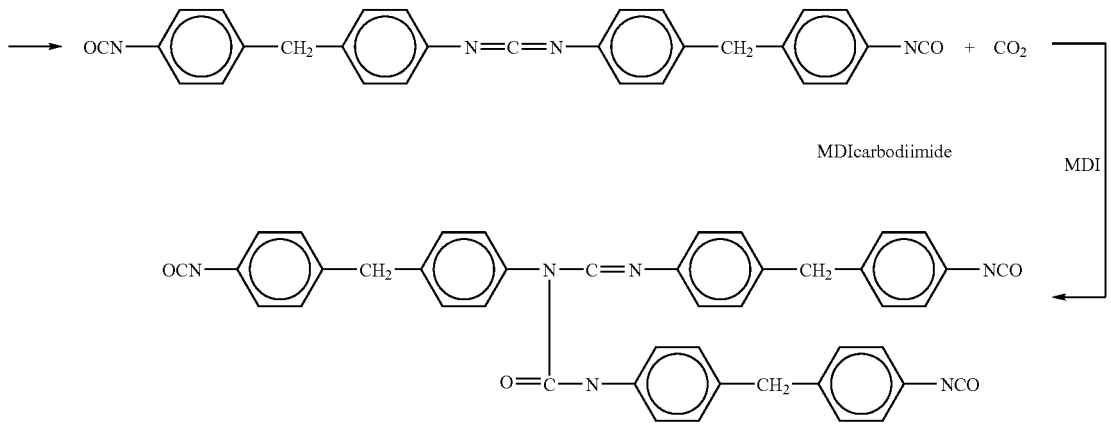

Carbodiimide reacts with MDI to make uretonimine.

The resulting mixture, namely CD MDI, is about 70% MDI with 30% of carbodiimide/uretonimine mixture.

CD MDI is a product like for example the product commercialised under the tradename Desmodur CD by the company Bayer AG.

PMDI is polymeric MDI, namely a polymeric Methylene Diphenyl Diisocyanate.

The surfactant consists of silicone polyether graft copolymers as for example the product commercialised under the tradename DC193 by the company Air Products.

The catalyst of example E is N,N'-dimethylbenzylamine.

COMPARATIVE EXAMPLE 6

Preparation of Product (F)

In a dissolver/mixer, 1000 kg of the following formulation was mixed at a temperature, increasing of from 10 to 23° C., with a tolerance of 1-2° C., for 20-25 minutes, PVC being added to the other components during this time of 20-25 minutes up to obtain a viscous paste-like product.

The starting formulation consists of 9% of PMDI, 15.0% of TDI (toluendiisocyanate), 8.0% of maleic anhydride, 55% of a polyvinyl chloride homopolymer having a K-value of 80-85 and a pH value of the aqueous extract equal to 4-7, 7.0% of phthalic anhydride, 3.6% of AZDN, 1.1% of ADC, 0.5% of TAU (styrene or vinylidene monomer) and 0.8% of $CaCO_3$.

Aluminum or steel molds were then filled with the paste-like product. The mold depth is 28 mm. The filled molds were then heated at 170-175° C. under a pressure of 200-400 bar for a total pressing time of 23 minutes (50 seconds×28 mm).

Expansion was made in hot water and/or steam for at least 13 hours and at a temperature of about 95-98° C. The expanded product was cooled at room temperature, possibly using suitable cooling means to accelerate the cooling step.

Then a curing step was carried out in hot water and/or steam at a temperature of from 40 to 70° C. for at least 2 days up to the end of all reactions.

The so obtained final cellular foamed-polymer product F based on PVC is endowed with properties which are indicated in Table 2.

In the following table 2, mechanical properties of the cellular foamed-polymer products according to examples 1-5 of the present invention and of the product of the comparative example 6 are disclosed.

TABLE 2

| Property | Measure Unit | A | B | C | D | E | Comp F |
|---|---|---|---|---|---|---|---|
| Nominal Density ISO 845 | $Kg/m^3$ | 48 | 80 | 80 | 130 | 60 | 60 |
| Compressive Strength* ASTM D 1621 | MPa | 0.7 | 1.4 | 1.55 | 3.1 | 1.0 | 0.78 |
| Compressive Modulus* ASTM D 1621 | MPa | 60 | 105 | 110 | 180 | 80 | 62 |
| Tensile Strength* ASTM D 1623 | MPa | 1.4 | 2.7 | 2.8 | 4.8 | 1.9 | 1.2 |
| Tensile Modulus* ASTM D 1623 | MPa | 60 | 105 | 105 | 180 | 80 | 40 |
| Shear Strength ASTM C 273 | MPa | 0.6 | 1.2 | 1.3 | 2.2 | 0.8 | 0.66 |
| Shear Modulus ASTM C 273 | MPa | 18 | 30 | 34 | 60 | 24 | 20 |
| Shear Strain ASTM C 273 | % | 18 | 30 | 38 | 40 | 22 | 8.45 |

*perpendicular to the plane. All values measured at +23° C.

Products A, B and E can be used for the vast majority of composite applications where both hand laminating and closed moulding processes such as infusion are employed.

With products A, B and E, major improvements have been made in all critical performances areas with respect to the product according to the state of the art. Strength properties have been increased of from 15% to about 50%, whereas the shear properties present even higher gains with respect to the products of the prior art.

Elongation to break has risen by up to 50% and also the ductility has been markedly improved. Both thermal and dimensional stability also present significant improvements. In fact, products A, B and E can be processed up to 90° C. with minimal dimensional changes. Continuous operating temperatures is −200° C. to +70° C. The so obtained foamed product can be used in sandwiches structures, for outdoor exposure, with external skin temperatures up to 85° C. Products A, B and E can be used as core material for industrial, transport and marine applications using room temperature cure, styrene-based, epoxy, and polyurethane resin systems. Such foamed products can be obtained in plain or contoured sheets as well as kits.

The main advantageous property of products C and D is the very high compatibility with all prepregs based on polyesters, based on vinylesters, based on epoxy compounds, used in the industry al over the world.

Products C and D are characterised by this very high compatibility with prepregs (both high temperature prepregs and low temperature prepregs), thanks to the dimensional stability of the material at low temperatures and high temperatures, clearly pointed out by the high value of heat distortion temperature (HDT) (measured according to DIN53424) equal to 170° C., in comparison with values of 115-130° C. typical of the materials according to the state of the art. Such very high compatibility is made possible also because the acidity of the foamed products C and D is substantially equal to zero (measured according to UNI EN ISO 2114).

Fracture toughness peel tests with polyester resin, vinyl ester resin or prepreg give the following results:

product C has a peel strength of about 1000 $J/m^2$, product D has a peel strength of about 1600 $J/m^2$, while products, having similar densities, according to the state of the art present peel strength values of about 650-700 $J/m^2$.

The invention claimed is:

1. A formulation for a cellular, foamed-polymer product, based on polyvinyl chloride, consisting of: a polyvinyl chloride homopolymer having a K-value of from 60 to 85 and a pH value of the aqueous extract ranging of from 8 to 12; at least one isocyanate selected from the group consisting of isomers and homologues of diphenylmethane-4,4'-diisocyanate, modified diphenylmethane-4,4'-diisocyanates and mixtures thereof; at least one anhydride selected from the group consisting of succinic anhydride, tetrahydrophthalic anhydride, hexahydrophthalic anhydride, methyl-tetrahydrophthalic anhydride, 4-methyl-hexahydrophthalic anhydride, cyclohexane-1,2-dicarboxylic anhydride, methyl-endomethylene tetrahydrophthalic anhydride, dodecenyl succinic anhydride, trimellitic anhydride and mixtures thereof; at least a surfactant where the surfactant is a silicone polyether graft copolymer; and at least a foaming agent.

2. The formulation according to claim 1, wherein the polyvinyl chloride is a polyvinyl chloride homopolymer having a K-value of from 60 to 75 and a pH value of the aqueous extract ranging of from 9 to 11.

3. The cellular, foamed-polymer product based on polyvinyl chloride, starting from a formulation according to claim 2.

4. The formulation according to claim 1, wherein the polyvinyl chloride is a polyvinyl chloride homopolymer having a K-value of 70 and a pH value of the aqueous extract equal to 10.

5. The formulation according to claim 1, wherein the isocyanate is modified diphenylmethane-4,4'-diisocyanates (4,4'-MDI).

6. The formulation according to claim 1, wherein the isocyanate is a mixtures of 4,4'-MDI and 4,4'-MDI reacted with carbodiimide to make uretonimine modified MDI.

7. The formulation according to claim 6, wherein the uretonimine modified MDI is a mixture of about 70% of 4,4'-MDI with about 30% of 4,4'-MDI reacted with carbodiimide.

8. The formulation according to claim 1, wherein the anhydrides are selected from the group consisting of methyl-tetrahydrophthalic anhydride, 4-methyl-hexahydrophthalic anhydride, cyclohexane-1,2-dicarboxylic anhydride and mixtures thereof.

9. The formulation according to claim 1, wherein the anhydride is a mixture of cyclohexane-1,2-dicarboxylic anhydride and 4-methyl-hexahydrophthalic anhydride in a ratio 70/30.

10. The formulation according to claim 1, wherein the silicone polyether graft copolymers is

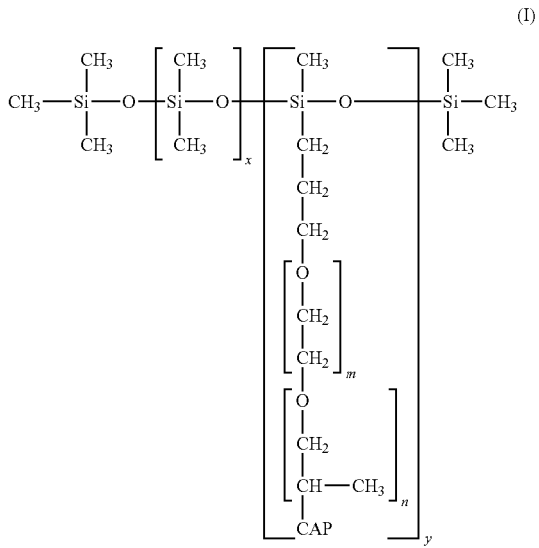

(I)

x representing dimethylsiloxane units; Y representing methylsiloxane units; m representing EO units; n representing PO Units and CAP representing capping groups.

11. The formulation according to claim 1, wherein the foaming agents are selected from the group consisting of 2,2'-azobis isobutyronitrile (AZDN) and azodicarbonamide (ADC) and mixtures thereof.

12. The formulation according to claim 1, wherein said formulation consists of a polyvinyl chloride homopolymer having a K-value of 70 and a pH value of the aqueous extract equal to 10; a mixture of 4,4'-MDI and 4,4'-MDI reacted with carbodiimide to make uretonimine modified MDI; a mixture of cyclohexane-1,2-dicarboxylic anhydride and 4-methyl-hexahydrophthalic anhydride in a ratio 70/30; silicone polyether graft copolymers according to formula (I), 2,2'-azobis isobutyronitrile (AZDN) and azodicarbonamide (ADC).

13. The formulation according to claim 1, wherein the components of the formulation range in the following amounts expressed as percentage by weight with respect to the total weight of the formulation: polyvinyl chloride in an amount ranging of from 35 to 60%; at least one anhydride in an amount of from 1 to 20%; at least one isocyanate in an amount of from 20 to 50%; at least a foaming agent in an amount of from 0.5 to 7%; at least a surfactant in an amount of from 0.08 to 0.8%.

14. The formulation according to claim 1, wherein the components of the formulation range in the following amounts expressed as a percentage by weight with respect to the total weight of the formulation: polyvinyl chloride in an amount ranging from 40 to 55%; at least one anhydride in an amount from 2 to 15%; at least one isocyanate in an amount of from 30 to 45%; at least a foaming agent in an amount of from 3 to 4.5%; at least a surfactant in an amount of from 0.1 to 0.6%.

15. A cellular, foamed-polymer product based on polyvinyl chloride, starting from a formulation consisting of a polyvinyl chloride homopolymer having a K-value of from 60 to 85 and a pH value of the aqueous extract ranging of from 8 to 12; at least one isocyanate selected from the group consisting of isomers and homologues of diphenylmethane-4,4'-diisocyanate, modified diphenylmethane-4,4'-diisocyanates and mixtures thereof; at least one anhydride selected from the group consisting of succinic anhydride, tetrahydrophthalic anhydride, hexahydrophthalic anhydride, methyl-tetrahydrophthalic anhydride, 4-methyl-hexahydrophthalic anhydride, cyclohexane-1,2-dicarboxylic anhydride, methyl-endomethylene tetrahydrophthalic anhydride, dodecenyl succinic anhydride, trimellitic anhydride and mixtures thereof; at least a surfactant where the surfactant is a silicone polyether graft copolymer; and at least a foaming agent.

16. A process for preparing a cellular foamed-polymer product starting from a formulation consisting of a polyvinyl chloride homopolymer, having a K-value of from 60 to 85 and a pH value of the aqueous extract ranging of from 8 to 12; at least one isocyanate selected from the group consisting of isomers and homologues of diphenylmethane-4,4'-diisocyanate and modified diphenylmethane-4,4'-diisocyanates and mixtures thereof; at least one anhydride selected from the group consisting of succinic anhydride, tetrahydrophthalic anhydride, hexahydrophthalic anhydride, methyl-tetrahydrophthalic anhydride, 4-methyl-hexahydrophthalic anhydride, cyclohexane-1,2-dicarboxylic anhydride, methyl-endomethylene tetrahydrophthalic anhydride, dodecenyl succinic anhydride, trimellitic anhydride and mixtures thereof; at least a surfactant where the surfactant is a silicone polyether graft copolymer; and at least a foaming agent;

said process comprising the following steps:
a) compounding the mixture by mixing the components under a vacuum, of from 0.7 to 0.99 bar, to obtain a product;
b) pouring the product of step a) into a mould and causing the product to undergo gelation under the action of temperature and pressure for a time ranging of from 40 seconds to 1 minute for each mm of height of the product in the mould, in order to obtain a semi-foamed molded product;
c) cooling the semi-foamed molded product to room temperature;
d) in case of products having a final density of less than 80 kg/m$^3$, adding the cooled product coming from step c) to steam at a temperature of 80-100° C. for a time of about 24 hours to expand to the final density; or
e) in case of products having a final density higher than 80 kg/m$^3$ adding the cooled product coming from step c) to hot water and/or steam at a temperature of 80-100° C. for a time ranging of from 50 minutes to 2 hours to expand the products to the final density to obtain an expanded product; the obtained expanded product being cooled to room temperature and then being treated in water spray and/or steam at a temperature of 40-70° C. to react any remaining isocyanates in order to obtain cured blocks or panels.

17. The process according to claim 16, wherein in step (b) gelation is carried out at a temperature ranging of from 150 to 200° C., and under a pressure ranging of from 200 to 400 bar for cm$^2$.

18. A process according to claim 16, wherein the product obtained from step c), before being submitted to step d) or step e), is submitted to a dry expansion step for a time ranging of from 1 to 2 hours, at a temperature ranging of from 75 to 100° C. in an anhydrous atmosphere.

19. A block or panel obtainable according to the process of claim 16.

* * * * *